(12) United States Patent
Kim et al.

(10) Patent No.: US 11,413,207 B2
(45) Date of Patent: Aug. 16, 2022

(54) WEARABLE APPARATUS FOR ASSISTING MUSCULAR STRENGTH

(71) Applicants: HYUNDAI MOTOR COMPANY, Seoul (KR); KIA MOTORS CORPORATION, Seoul (KR)

(72) Inventors: Kyu Jung Kim, Seoul (KR); Hyun Seop Lim, Anyang-si (KR); Beom Su Kim, Yongin-si (KR); Ju Young Yoon, Suwon-si (KR); Dong Jin Hyun, Suwon-si (KR); Ki Hyeon Bae, Yongin-si (KR)

(73) Assignees: HYUNDAI MOTOR COMPANY, Seoul (KR); KIA MOTORS CORPORATION, Seoul (KR)

( * ) Notice: Subject to any disclaimer, the term of this patent is extended or adjusted under 35 U.S.C. 154(b) by 138 days.

(21) Appl. No.: 16/688,641

(22) Filed: Nov. 19, 2019

(65) Prior Publication Data
US 2020/0261298 A1    Aug. 20, 2020

(30) Foreign Application Priority Data
Feb. 19, 2019    (KR) .................... 10-2019-0019353

(51) Int. Cl.
*A61H 1/02* (2006.01)
*B25J 9/00* (2006.01)
(Continued)

(52) U.S. Cl.
CPC .............. *A61H 1/0281* (2013.01); *A61H 1/00* (2013.01); *B25J 9/0006* (2013.01); *B25J 9/0009* (2013.01);
(Continued)

(58) Field of Classification Search
CPC .............. A61H 1/02; A61H 2001/0207; A61H 2001/0274; A61H 2001/0277;
(Continued)

(56) References Cited

U.S. PATENT DOCUMENTS 4,180,870 A * 1/1980 Radulovic ............... A61F 5/013
                                                              623/26
4,669,451 A * 6/1987 Blauth .................. A61F 5/013
                                                              601/33
(Continued)

FOREIGN PATENT DOCUMENTS

KR    10-2016-0062969 A    6/2016
KR    10-1896181 B1    9/2018
(Continued)

*Primary Examiner* — Justine R Yu
*Assistant Examiner* — Alexander Morales
(74) *Attorney, Agent, or Firm* — Morgan, Lewis & Bockius LLP (57) ABSTRACT

A wearable apparatus for assisting muscular strength includes: a main body mechanism extending in a vertical direction of a wearer's torso, and being fixed to a side of a wearer's torso under a wearer's shoulder; a fastening mechanism extending along an extension direction of a wearer's upper arm, and being disposed at and being in contact with a lower surface of the wearer's upper arm; a connecting mechanism having a first end coupled to the fastening mechanism and a second end movably coupled to the main body mechanism so as to be movable with respect to the main body mechanism; and a support mechanism movably coupled between the first end and the second end of the connecting mechanism to apply a support force to the connecting mechanism, and coupled to the main body mechanism and movable with respect thereto.

14 Claims, 6 Drawing Sheets

(51) Int. Cl.
*A61H 1/00* (2006.01)
*B25J 9/10* (2006.01)

(52) U.S. Cl.
CPC ........... *B25J 9/0027* (2013.01); *B25J 9/1005* (2013.01); *A61H 2001/0203* (2013.01); *A61H 2201/149* (2013.01); *A61H 2201/1418* (2013.01); *A61H 2201/1616* (2013.01); *A61H 2201/1652* (2013.01); *A61H 2205/06* (2013.01)

(58) Field of Classification Search
CPC .... A61H 2001/0281; A61H 2201/1253; A61H 2201/1261; A61H 2201/1269; A61H 2201/1418; A61H 2201/149; A61H 2201/1623; A61H 2201/1626; A61H 2201/1671; A61H 2205/06; A61H 2205/062; B25J 9/0006
USPC .......................................................... 601/33
See application file for complete search history.

(56) References Cited

U.S. PATENT DOCUMENTS

| | | | |
|---|---|---|---|
| 6,082,034 A | 7/2000 | Musmanno | |
| 2008/0261786 A1* | 10/2008 | Laramore | A63B 21/4047 482/124 |
| 2010/0204804 A1* | 8/2010 | Garrec | B25J 9/0006 623/24 |
| 2011/0164949 A1 | 7/2011 | Kim et al. | |
| 2012/0046583 A1* | 2/2012 | Nakamitsu | A61F 5/3723 602/4 |
| 2016/0081871 A1 | 3/2016 | Doyle | |
| 2016/0339583 A1* | 11/2016 | Van Engelhoven | B25H 1/10 |
| 2017/0189257 A1* | 7/2017 | Lan | A63B 21/4017 |
| 2017/0224517 A1* | 8/2017 | Doyle | B25J 9/0006 |
| 2018/0360636 A1* | 12/2018 | Rahman | A61F 5/013 |

FOREIGN PATENT DOCUMENTS

| | | | | |
|---|---|---|---|---|
| WO | 2018/082906 A1 | 5/2018 | | |
| WO | WO-2018224555 A1 * | 12/2018 | ............. | A61F 5/013 |
| WO | WO-2019081851 A1 * | 5/2019 | ............. | B25J 9/126 |

\* cited by examiner

WEARABLE APPARATUS FOR ASSISTING MUSCULAR STRENGTH

CROSS REFERENCE TO RELATED APPLICATION

The present application claims the benefit of priority to Korean Patent Application No. 10-2019-0019353, filed on Feb. 19, 2019 in the Korean Intellectual Property Office, the entire contents of which are incorporated herein for all purposes by this reference.

TECHNICAL FIELD

The present disclosure relates generally to a wearable apparatus for assisting muscular strength. More particularly, the present disclosure relates to an apparatus for supporting a wearer's upper arm by compensating for a load due to gravity.

BACKGROUND

A wearable robot is a robot that assists the movement of the body by being put on a specific part of the body or by being mounted to a specific part, and is designed to be used for medical, military, or industrial purposes. In particular, in the case of wearable robots for work, they are designed to prevent injuries and to support muscle strength by reducing the load applied to the worker. The wearable robot is a robot that is made by mimicking a wearer's exoskeleton, and it is the core of the technology to design the joint to have the same motion as the actual motion of the body.

In particular, a wearable device for assisting upper arm muscle strength includes a manual support mechanism configured to support a person supporting the weight of a tool. A typical manual support mechanism is configured to compensate for gravity under a range of positions by using a combination of structural elements, springs, cables, and pulleys. The configuration of these devices provides gravity compensation within a limited operating range of operation.

However, the conventional wearable device for assisting upper arm muscle strength is problematic in that since it is an exoskeleton simulating a wearer's shoulder joint, interference in the exoskeleton configuration occurs in the work area of the wearer, so the operating range of the shoulder joint may be limited.

The conventional wearable device for assisting upper arm muscle strength is further problematic in that since the load is continuously applied even in the region where the muscle aids are not required when the upper arm is lowered below a predetermined angle, the wearer may experience inconvenience.

The foregoing is intended merely to aid in the understanding of the background of the present disclosure, and is not intended to mean that the present disclosure falls within the purview of the related art that is already known to those skilled in the art.

SUMMARY

Accordingly, the present disclosure has been made keeping in mind the above problems occurring in the related art, and the present disclosure is intended to propose a wearable apparatus for assisting muscular strength, the apparatus capable of applying a support force required according to an angle of the wearer's upper arm without causing interference in the work area of the wearer.

In order to achieve the above object, according to one aspect of the present disclosure, a wearable apparatus for assisting muscular strength may include: a main body mechanism extending in a vertical direction of a wearer's torso, and being fixed to a side of a wearer's torso under a wearer's shoulder; a fastening mechanism extending along an extension direction of a wearer's upper arm, the fastening mechanism being in contact with a lower surface of the wearer's upper arm; a connecting mechanism having a first end coupled to the fastening mechanism and a second end movably coupled to the main body mechanism, the connecting mechanism being movable with respect to the main body mechanism; and a support mechanism movably coupled between the first end and the second end of the connecting mechanism to apply a support force to the connecting mechanism, the support mechanism being coupled to the main body mechanism and movable with respect to the main body mechanism, wherein the support force is varied depending on a position of the support mechanism with respect to the main body mechanism.

The apparatus may further include a torso harness being coupled to the main body mechanism and surrounding the wearer's torso such that the main body mechanism is fixed to the side of the wearer's torso.

The apparatus may further include a shoulder harness being configured such that a first end thereof is coupled to the torso harness disposed at a front of the wearer, and a second end thereof is coupled to the torso harness disposed at a back of the wearer via an upper portion of the wearer's shoulder.

The main body mechanism may include: a fixed part fixed to the wearer's torso by being brought in contact with the side of the wearer's torso; and a rotatable part coupled to the fixed part and rotatable about a rotation axis parallel to a direction in which the main body mechanism extends, and the connecting mechanism and the support mechanism may be coupled to the rotatable part.

The fixed part and the rotatable part may be rotatably coupled to each other at a plurality of positions spaced apart from each other along the rotation axis.

The fastening mechanism may be coupled to the first end of the connecting mechanism and rotatable about a rotation axis parallel to a rotation axis of a shoulder joint of a wearer's upper arm rotating upward or downward.

The main body mechanism may include a first sliding groove extending in the vertical direction of the wearer's torso, and as the second end of the connecting mechanism slides along the first sliding groove, the connecting mechanism may move with respect to the main body mechanism.

The support mechanism may include: an elastic body generating an elastic force; and a first roller coupled to the main body mechanism and movable with respect to the main body mechanism by being connected to a first end of the elastic body through a wire, and the elastic force of the elastic body is varied depending on relative positions of the first roller and the main body mechanism, and the support force applied to the connecting mechanism may be varied.

The connecting mechanism may include: a second sliding groove extending in a longitudinal direction of the connecting mechanism; and a coupling body movable along the second sliding groove, and the coupling body may be integrally coupled with the first roller.

The main body mechanism may include a profile groove extending to allow the first roller to be movable therealong such that support torque is generated by the support force applied to the connecting mechanism.

The profile groove may have a cam surface having a predetermined cam profile, and a moving trajectory of the first roller corresponds to the cam surface. A magnitude and a direction of the support force applied to the connecting mechanism may vary and a point to which the support force is applied may vary. The support torque may vary depending on a position of the first roller in the profile groove.

The support torque generated by the support force may be 0, when an angle between the main body mechanism and the connecting mechanism is a first predetermined angle or less.

The support torque generated by the support force may decrease as an angle between the main body mechanism and the connecting mechanism increases, when the angle is a second predetermined angle or more.

The support torque generated by the support force applied to the connecting mechanism may have a maximum value, when an angle between the main body mechanism and the connecting mechanism is in a range between a first predetermined angle and a second predetermined angle.

The apparatus may further include an adjusting mechanism connected to a second end of the elastic body to move the second end of the elastic body, thereby varying the elastic force of the elastic body.

The adjusting mechanism may include: a threaded plate integrally coupled to the main body mechanism; and a rotating screw threaded with the threaded plate while being connected to the second end of the elastic body, and as the rotating screw rotates, the second end of the elastic body may move with respect to the threaded plate.

According to the wearable apparatus for assisting muscular strength of the present disclosure, it is possible to prevent interference with an external device in the work area of the wearer by supporting the wearer's upper arm under the wearer's shoulder.

It is further advantageous in that it is possible to vary the support force required according to the angle of the wearer's upper arm, and the load is eliminated in the region below a predetermined angle where the support force is not required.

BRIEF DESCRIPTION OF THE DRAWINGS

The above and other objects, features and other advantages of the present disclosure will be more clearly understood from the following detailed description when taken in conjunction with the accompanying drawings, in which.

DETAILED DESCRIPTION OF THE INVENTION

In the following description, the structural or functional description specified to exemplary embodiments according to the concept of the present disclosure is intended to describe the exemplary embodiments, so it should be understood that the present disclosure may be variously embodied, without being limited to the exemplary embodiments.

The exemplary embodiments according to the concept of the present disclosure may be variously modified and may have various shapes, so examples of which are illustrated in the accompanying drawings and will be described in detail with reference to the accompanying drawings. However, it should be understood that the exemplary embodiments according to the concept of the present disclosure are not limited to the exemplary embodiments which will be described hereinbelow with reference to the accompanying drawings, but various modifications, equivalents, additions and substitutions are possible, without departing from the scope and spirit of the invention.

It will be understood that, although the terms first, second, etc. may be used herein to describe various elements, these elements should not be limited by these terms. These terms are only used to distinguish one element, from another element. For instance, a first element discussed below could be termed a second element without departing from the teachings of the present disclosure. Similarly, the second element could also be termed the first element.

It will be understood that when an element is referred to as being "coupled" or "connected" to another element, it can be directly coupled or connected to the other element or intervening elements may be present therebetween. In contrast, it should be understood that when an element is referred to as being "directly coupled" or "directly connected" to another element, there are no intervening elements present. Further, the terms used herein to describe a relationship between elements, for example, "between", "directly between", "adjacent" or "directly adjacent" should be interpreted in the same manner as those described above.

The terminology used herein is for the purpose of describing particular embodiments only and is not intended to be limiting. As used herein, the singular forms "a", "an", and "the" are intended to include the plural forms as well, unless the context clearly indicates otherwise. It will be further understood that the terms "comprise", "include", "have", etc. when used in this specification, specify the presence of stated features, integers, steps, operations, elements, components, and/or combinations of them but do not preclude the presence or addition of one or more other features, integers, steps, operations, elements, components, and/or combinations thereof.

Unless otherwise defined, all terms including technical and scientific terms used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

Hereinbelow, an exemplary embodiment of the present disclosure will be described in detail with reference to the accompanying drawings. Throughout the drawings, the same reference numerals will refer to the same or like parts.

Figure 1:
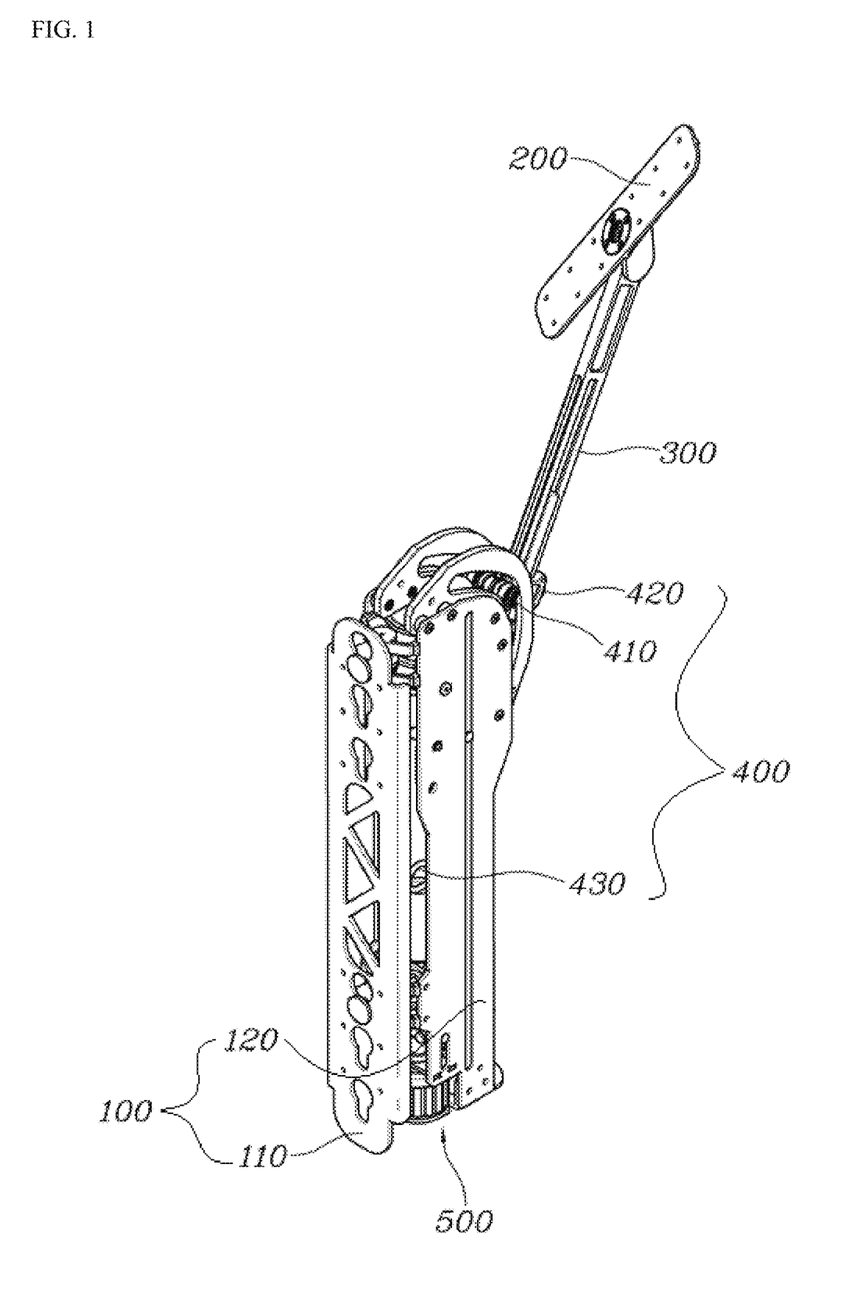
FIG. 1 is a perspective view showing a wearable apparatus for assisting muscular strength according to an exemplary embodiment of the present disclosure.
Figure 2:
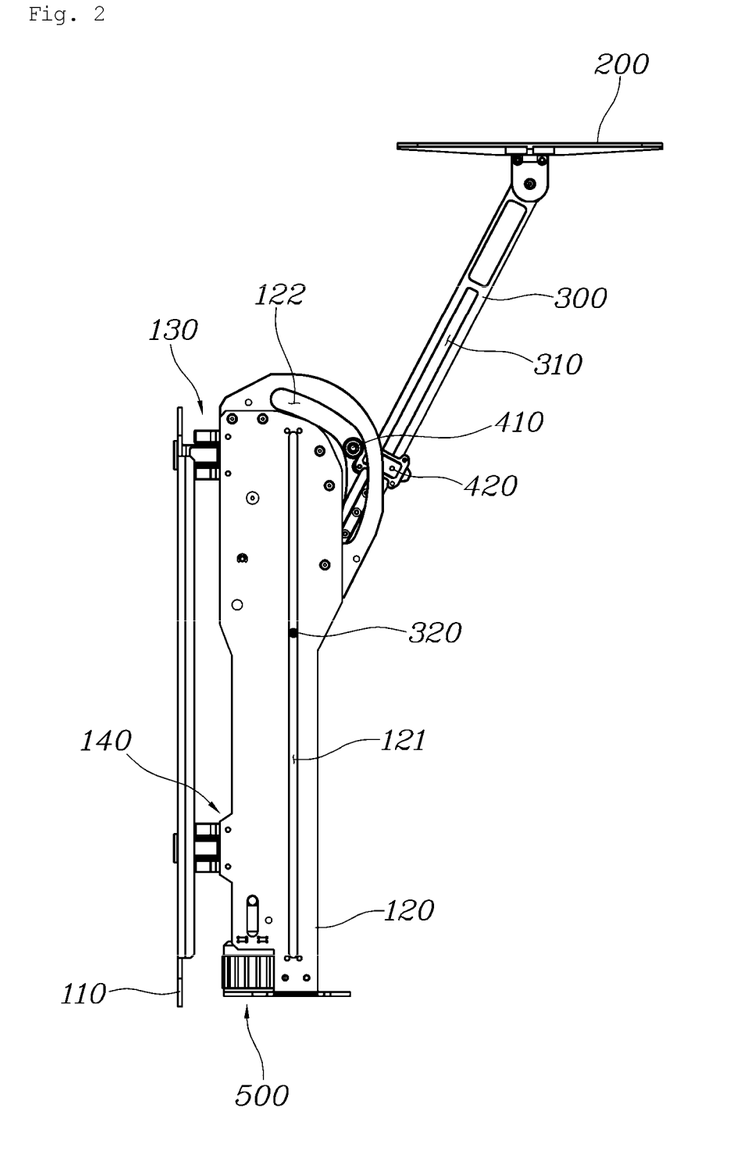
FIG. 2 is a front view showing the wearable apparatus for assisting muscular strength according to an exemplary embodiment of the present disclosure.
Figure 3A:
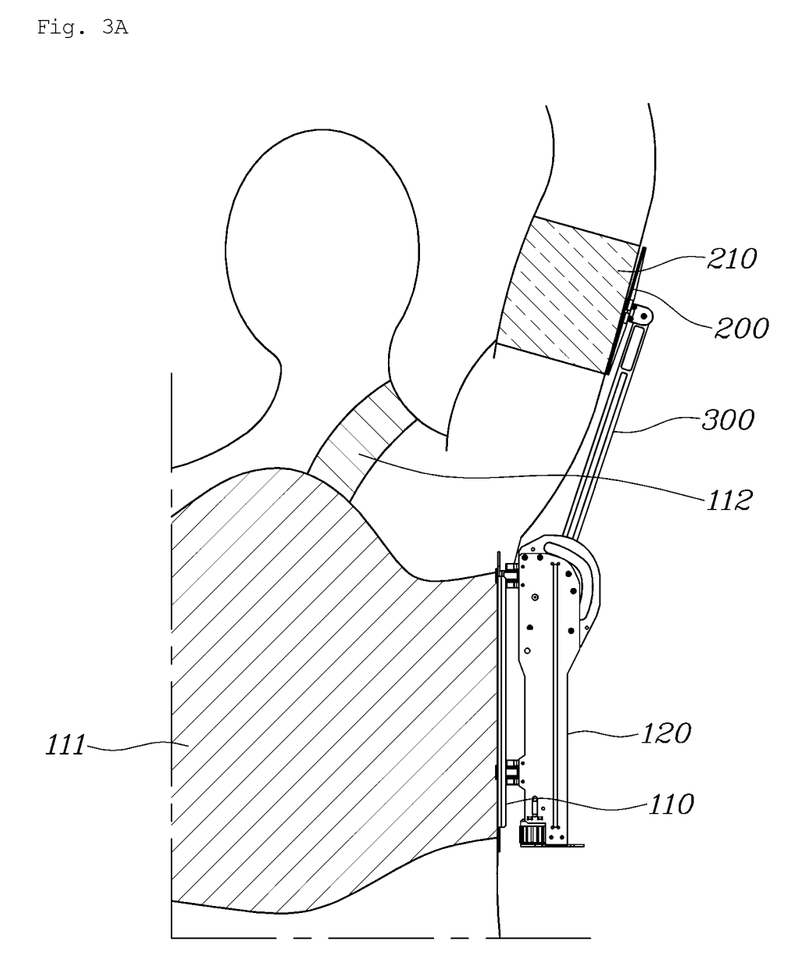
FIGS. 3A and 3B are views showing a state of wearing the wearable apparatus for assisting muscular strength according to an exemplary embodiment of the present disclosure.
Figure 3B:
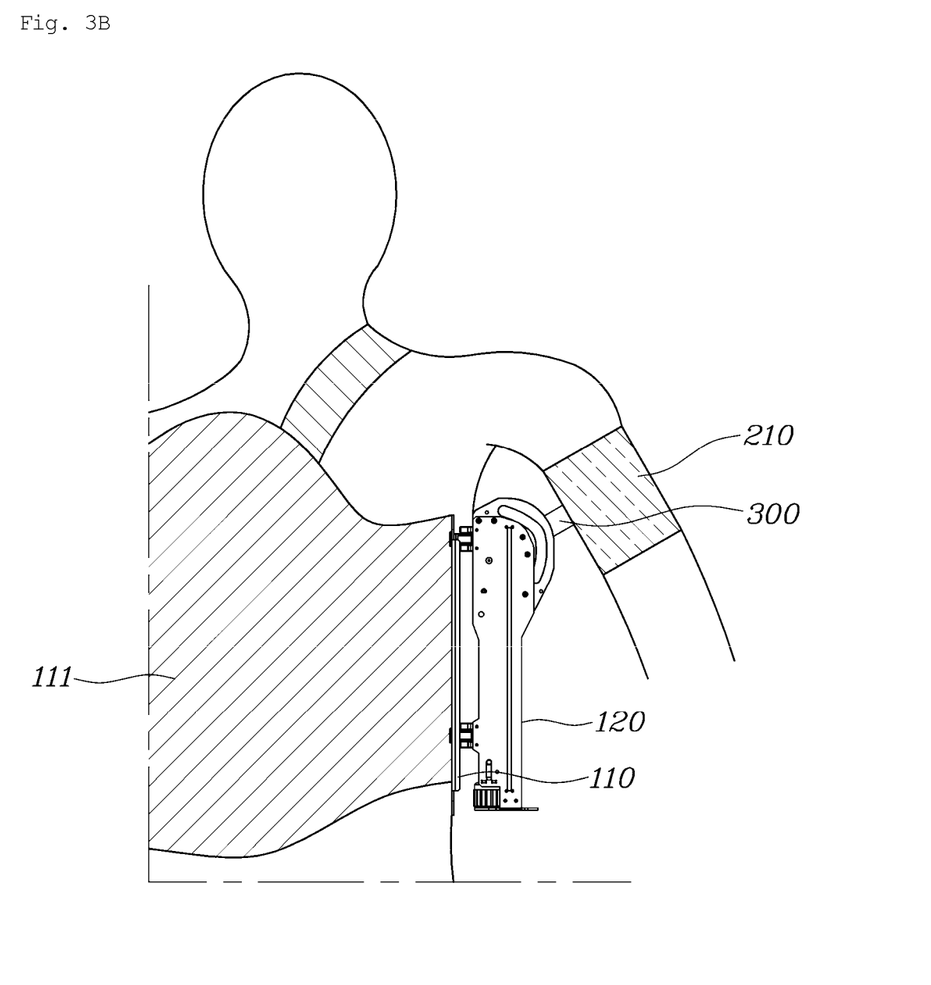

FIG. 1 is a perspective view showing a wearable apparatus for assisting muscular strength according to an exemplary embodiment of the present disclosure, FIG. 2 is a front view showing the wearable apparatus for assisting muscular strength according to an exemplary embodiment of the present disclosure, and FIGS. 3A and 3B are views showing a state of wearing the wearable apparatus for assisting muscular strength according to an exemplary embodiment of the present disclosure.

With reference to FIGS. 1 to 3, the wearable apparatus for assisting muscular strength according to an exemplary embodiment of the present disclosure includes: a main body mechanism 100 extending in a vertical direction of a wearer's torso, and being fixed to a side of a wearer's torso under a wearer's shoulder; a fastening mechanism 200 extending along an extension direction of a wearer's upper arm, and being provided to be brought in contact with a lower surface of the wearer's upper arm; a connecting mechanism 300 being configured such that a first end thereof is coupled to the fastening mechanism 200, and a second end thereof is movably coupled to the main body mechanism 100 so as to be movable with respect to the main body mechanism 100; and a support mechanism 400 movably coupled between the first end and the second end of the connecting mechanism 300 to apply a support force to the connecting mechanism 300, and coupled to the main body mechanism 100 to be movable with respect to the main body mechanism, whereby the support force is varied depending on a position of the support mechanism 400 with respect to the main body mechanism 100.

The main body mechanism 100, which is coupled to the wearer's torso, extends in the vertical direction of the wearer's torso, that is, the extension direction and is fixed to the side of the wearer's torso. In particular, the main body mechanism 100 is fixed to the side of the wearer's torso under the wearer's shoulder, and may be fixed to the wearer's flank.

The fastening mechanism 200 is a shape that extends along the extension direction of the wearer's upper arm, and is brought in contact with the lower surface of the wearer's upper arm to be fastened thereto. The fastening mechanism 200 may be in the form of a plate extending in a plane or may be curved into a curved surface to surround the side of the wearer's upper arm. The fastening mechanism 200 may be fastened through an upper arm harness 210 surrounding the wearer's upper arm.

The connecting mechanism 300, which is a mechanism connecting the fastening mechanism 200 and the main body mechanism 100 together, is configured such that the first end thereof is coupled to the fastening mechanism 200 and the second end thereof is coupled to the main body mechanism 100. Herein, the second end of the connecting mechanism 300 is movably coupled to the main body mechanism 100, so the connecting mechanism 300 and the main body mechanism 100 can be moved with respect to each other by sliding along the main body mechanism 100.

The support mechanism 400 applies the support force to the connecting mechanism 300 to generate the support torque in the connecting mechanism 300. Further, the support mechanism 400 is movably coupled between the first end and the second end of the connecting mechanism 300, so the point of application of the support force applied to the connecting mechanism 300 by the support mechanism 400 may be varied.

The support mechanism 400 may be disposed inside the main body mechanism 100. In particular, the support mechanism 400 is coupled to the main body mechanism 100 to be movable with respect thereto, and as the support mechanism 400 moves with respect to the main body mechanism 100, the position of the support mechanism 400 with respect to the main body mechanism 100 is changed, and accordingly, the support force applied to the connecting mechanism 300 may be changed.

In other words, the support mechanism 400 is movable with respect to both the main body mechanism 100 and the connecting mechanism 300, and accordingly, the support force applied to the connecting mechanism 300 by the support mechanism 400 is varied, and the point of application of the support force applied to the connecting mechanism 300 by the support mechanism 400 may be also varied. Thus, the support torque applied to the connecting mechanism 300 may be varied.

Accordingly, the present disclosure has the effect of preventing interference with an external device in the work area of the wearer by supporting the wearer's upper arm under the wearer's shoulder, and can change the support torque applied to the connecting mechanism 300 depending on the position of the upper arm.

The main body mechanism 100 may be fixed to the wearer's torso through a separate harness.

To be specific, the wearable apparatus may further include a torso harness 111 that is coupled to the main body mechanism 100, and surrounds the wearer's torso such that the main body mechanism 100 is fixed to the side of the wearer's torso. The torso harness 111 may surround the side of the wearer's torso.

Further, the wearable apparatus may further include a shoulder harness 112 that is configured such that a first end thereof is coupled to the torso harness 111 disposed at the front of the wearer, and a second end thereof is coupled to the torso harness 111 disposed at the back of the wearer via an upper portion of the wearer's shoulder. The shoulder harness 112 may fix the torso harness 111 not to be moved in the vertical direction of the wearer's torso.

The main body mechanism 100 may include: a fixed part 110 fixed to the wearer's torso by being brought in contact with the side of the wearer's torso; and a rotatable part 120 coupled to the fixed part 110 to be rotatable about a rotation axis parallel to a direction in which the main body mechanism 100 extends, and the connecting mechanism 300 and the support mechanism 400 may be coupled to the rotatable part 120.

The fixed part 110, which is fixed to the side of the wearer's torso, may be fastened to the torso harness 111 to be fixed to the wearer's torso.

The rotatable part 120, which is rotatably coupled to the fixed part 110, may be rotatable about the fixed part 110 as the rotation axis parallel to the direction in which the main body mechanism 100 extends. In other words, the rotatable part 120 may be rotatable in the front or back side of the wearer based on the fixed part 110 fixed to the wearer's flank.

The connecting mechanism 300 and the support mechanism 400 are coupled to the rotatable part 120 such that the rotatable part 120 rotates as the wearer's upper arm rotates forward or backward about the shoulder joint, thereby compensating for the forward and backward movement of the wearer's upper arm.

In particular, the fixed part 110 and the rotatable part 120 may be rotatably coupled to each other at a plurality of positions 130 and 140 spaced apart from each other along the rotation axis parallel to the direction in which the main body mechanism 100 extends.

In other words, the fixed part 110 and the rotatable part 120 are rotatably coupled to each other at the plurality of positions 130 and 140 vertically spaced apart from each other, so the main body mechanism 100 may stably support the connecting mechanism 300 and the support mechanism 400.

The fastening mechanism 200 may be coupled to the first end of the connecting mechanism 300 to be rotatable about a rotation axis parallel to a direction of a rotation axis rotating upward or downward about the shoulder joint of the wearer's upper arm.

The fastening mechanism 200, which is brought in contact with the lower surface of the wearer's upper arm to support the wearer's upper arm, should be rotated as the angle of the wearer's upper arm with respect to the wearer's torso is changed. Thus, in order for the wearer's upper arm to freely rotate upward about the shoulder joint, the fastening mechanism 200 may be rotatably coupled to the first end of the connecting mechanism 300.

In particular, the rotation axes of the fastening mechanism 200 and the connecting mechanism 300 may be parallel to the rotation axis rotating upward or downward about the shoulder joint of the wearer's upper arm.

In addition, the second end of the connecting mechanism 300, which will be described later, may be provided with a second roller 320 sliding along a first sliding groove 121 formed in the main body mechanism 100. The second roller 320 allows the connecting mechanism 300 to be rotatable about the rotation axis parallel to the rotation axis rotating upward or downward about the shoulder joint of the wearer's upper arm.

Accordingly, the upward and downward movement of the wearer's upper arm may be compensated by rotatable coupling between the first end of the connecting mechanism 300 and the fastening mechanism 200, and rotatable coupling between the second end of the connecting mechanism 300 and the main body mechanism 100.

To be specific, the main body mechanism 100 is provided with the first sliding groove 121 extending in the vertical direction of the wearer's torso, and as the second end of the connecting mechanism 300 slides along the first sliding groove 121, the connecting mechanism 300 can be moved with respect to the main body mechanism 100.

The second end of the connecting mechanism 300 is provided with the second roller 320 so as to be movable along the first sliding groove 121. Further, the second roller 320 of the connecting mechanism 300 may be configured to be freely rotatable within the first sliding groove 121, so the connecting mechanism 300 can be rotatable about the second roller 320 parallel to the rotation axis rotating upward or downward about the shoulder joint of the wearer's upper arm.

Accordingly, the second end of the connecting mechanism 300 can be translated along the first sliding groove 121 and can be rotated within the first sliding groove 121, thereby compensating for the positional movement due to the wearer's upper arm rotates about the shoulder joint as well as the fastening mechanism 200.

Figure 4:
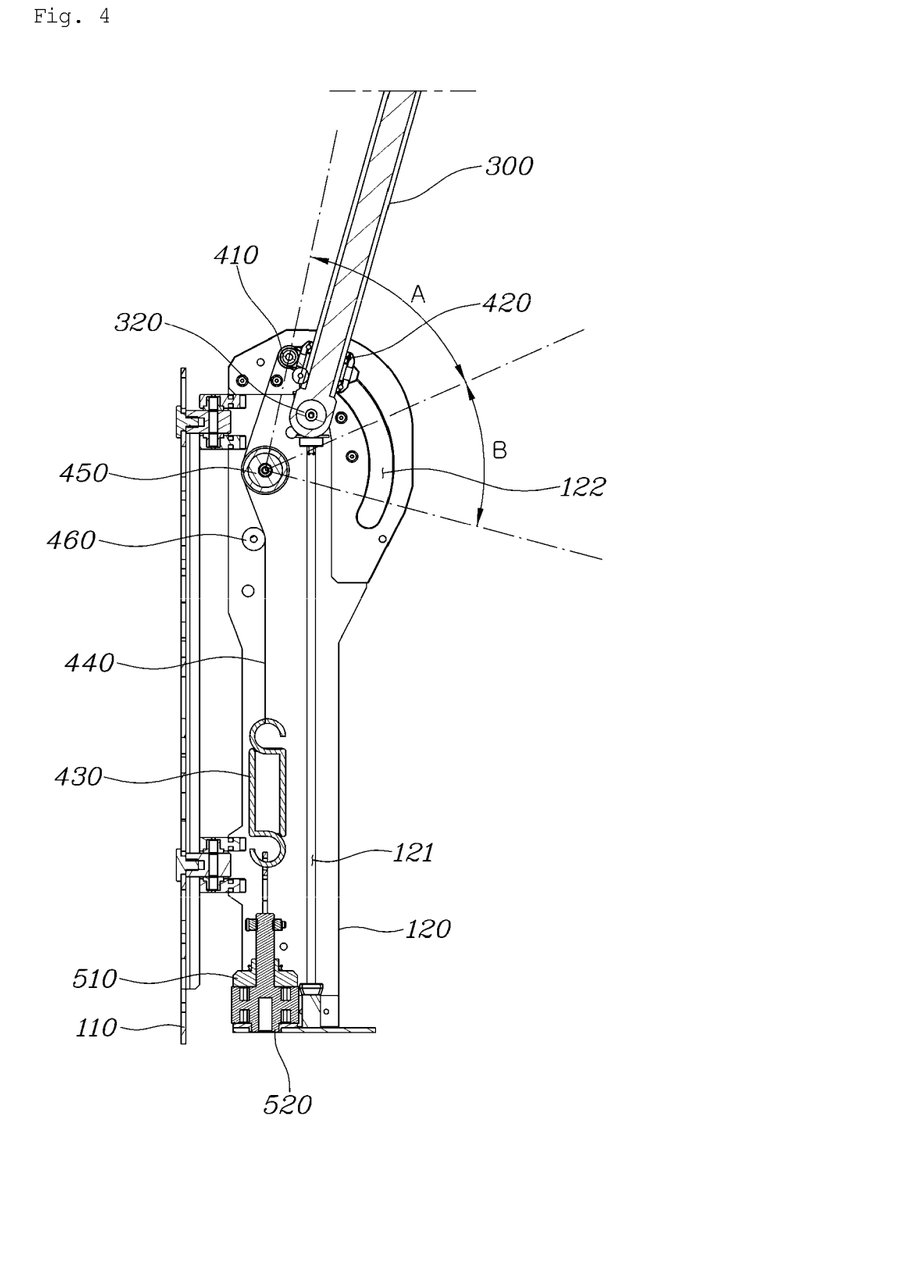
FIG. 4 is an interior view showing the wearable apparatus for assisting muscular strength according to an exemplary embodiment of the present disclosure.

FIG. 4 is an interior view showing the wearable apparatus for assisting muscular strength according to an exemplary embodiment of the present disclosure.

With further reference to FIG. 4, the support mechanism 400 of the wearable apparatus for assisting muscular strength according to an exemplary embodiment of the present disclosure may include: an elastic body 430 generating an elastic force by deformation; and a first roller 410 coupled to the main body mechanism 100 to be movable with respect to the main body mechanism by being connected to a first end of the elastic body 430 through a wire 440. Herein, depending on relative positions of the first roller 410 and the main body mechanism 100, the elastic force of the elastic body 430 is varied, and the support force applied to the connecting mechanism 300 may be varied.

The support mechanism 400 may include the elastic body 430 such as a spring that generates an elastic force by deformation. The first end of the elastic body 430 is connected with the first roller 410 through the wire 440, and the first roller 410 is coupled to the main body mechanism 100 to be movable with respect thereto, so when the first roller 410 moves with respect to the main body mechanism 100, the relative position between the first roller 410 and the main body mechanism 100 may be changed.

The wire 440, which is connected from the first end of the elastic body 430 to the first roller 410, is fixed to the main body mechanism 100 between the first end of the elastic body 430 and the first roller 410 so as to be brought in contact with a first rotation shaft 450 and a second rotation shaft 460 rotatably coupled to each other.

When the relative position between the first roller 410 and the main body mechanism 100 is changed, the distance between the first roller 410 and the first end of the elastic body 430 may be changed, whereby the force that pulls the elastic body 430 in the first end of the elastic body 430 is changed according to change in the length of the wire 440, to induce the deformation of the elastic body 430, thereby changing the elastic force.

The connecting mechanism 300 may include: a second sliding groove 310 extending in a longitudinal direction of the connecting mechanism 300; and a coupling body 420 movable along the second sliding groove 310, wherein the coupling body 420 may be integrally coupled with the first roller 410.

In other words, the coupling body 420 integrally coupled with the first roller 410 may be movable along the longitudinal direction of the connecting mechanism 300. Thus, the coupling body 420 integrally coupled with the first roller 410, to which the elastic force of the elastic body 430 is applied, slides along the longitudinal direction of the connecting mechanism 300, and the point of application where the support force is applied to the connecting mechanism 300 may be varied. In other words, the torque applied to the connecting mechanism 300 may be varied.

Figure 5:
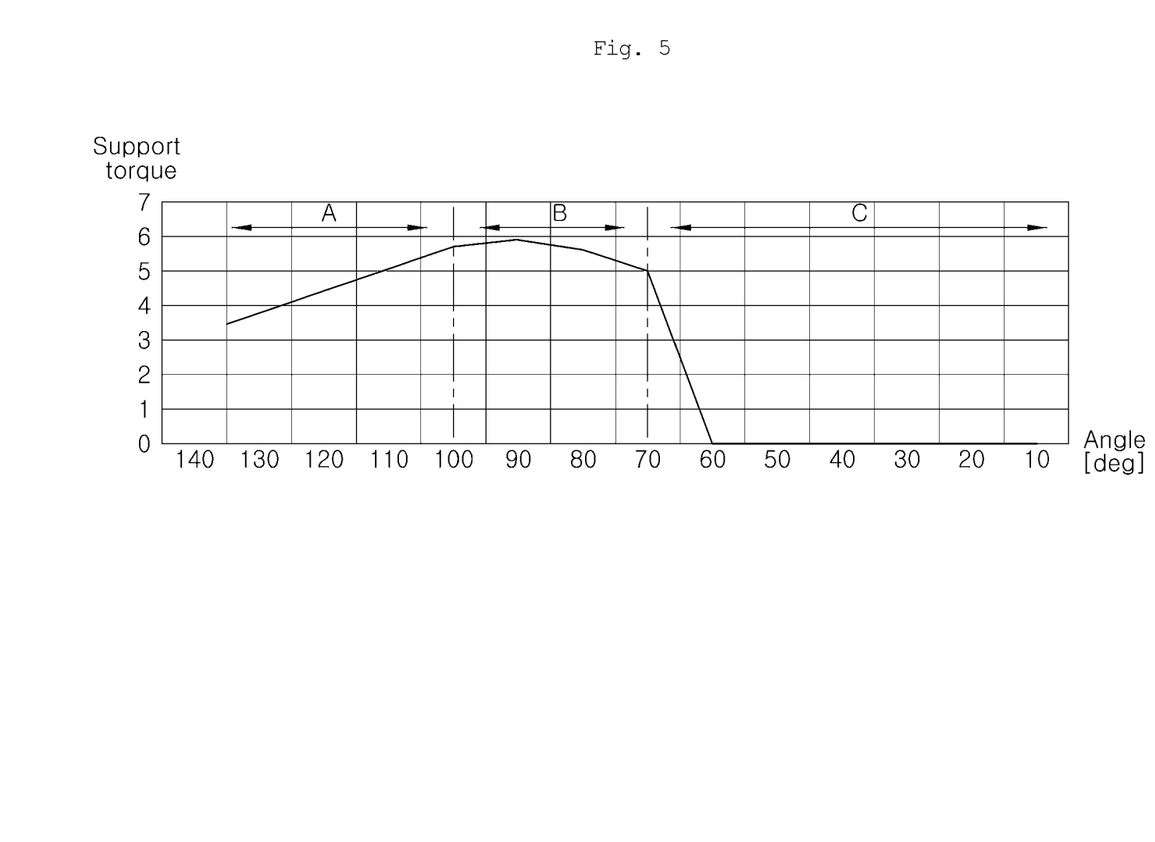
FIG. 5 is a view showing support torque profile according to an angle of a wearer's upper arm wearing the wearable apparatus for assisting muscular strength according to an exemplary embodiment of the present disclosure.

FIG. 5 is a view showing torque profile according to an angle of a wearer's upper arm wearing the wearable apparatus for assisting muscular strength according to an exemplary embodiment of the present disclosure.

With further reference to FIG. 5, the main body mechanism 100 may be provided with a profile groove 122 extending to allow the first roller 410 to be movable therealong, such that the support torque is varied by the support force applied to the connecting mechanism 300.

The profile groove 122 may be formed with a cam surface having a predetermined cam profile. A moving trajectory of the first roller 410 may correspond to the cam surface of the profile groove 122. As the first roller 410 slides along the profile groove 122, the magnitude and the direction of the support force applied to the connecting mechanism 300 may be varied and the point of application of the support force may be varied, and accordingly, the support torque by the support force may be varied. That is, the support torque may vary depending on a position of the first roller 410 in the profile groove 122 having the cam surface.

To be specific, in a section (section A) where an angle between the main body mechanism 100 and the connecting mechanism 300 is a second predetermined angle or more, the profile groove 122 may be configured such that the support torque by the support force is gradually increased as the angle is decreased.

Further, in a section (section B) where the angle between the main body mechanism 100 and the connecting mechanism 300 is in a range between a first predetermined angle or more and the second predetermined angle or less, the profile groove 122 may be configured such that the support torque by the support force allied to the connecting mechanism 300 has a maximum value. In particular, the maximum value of the support torque may be a predetermined separation angle or more.

Further, in a section (section C) where the angle between the main body mechanism 100 and the connecting mechanism 300 is a predetermined separation angle or less, the support torque may converge to 0 as the angle is decreased by being mechanically separated from the mechanism that provides support torque. In particular, the support torque may converge to 0 from the separation angle to the first angle, and the support torque may be 0 at an angle of the first angle or less. Herein, the first angle is predetermined to be smaller than the separation angle.

In particular, when the angle between the main body mechanism 100 and the connecting mechanism 300 is the first predetermined angle or less, the profile groove 122 may be configured such that the support torque by the support force is 0. The support torque applied to the connecting mechanism 300 may be linearly decreased from the predetermined separation angle (for example, about 70 [deg]), and at an angle of the first predetermined angle (for example, about 60 [deg]) or less, the support torque may be 0.

At an angle of the first predetermined angle or less, the elastic force applied from the elastic body 430 to the first roller 410 is transmitted to the main body mechanism 100 and the support force applied to the connecting mechanism 300 can be 0. Thus, when the wearer's upper arm moves down to a predetermined angle or less, the arm can freely move by eliminating the load that interferes with the movement of the wearer's upper arm.

Further, when the angle between the main body mechanism 100 and the connecting mechanism 300 is the second predetermined angle or more, the profile groove 122 may be configured such that the support torque by the support force is decreased as the angle between the main body mechanism 100 and the connecting mechanism 300 is increased.

When the angle between the main body mechanism 100 and the connecting mechanism 300 is the second predetermined angle (for example, about 100 [deg]) or more, the elastic force may be decreased such that the support torque supporting the wearer's upper arm is decreased.

In other words, as the angle between the main body mechanism 100 and the connecting mechanism 300 is increased, the distance between the first roller 410 and the first end of the elastic body 430 is reduced to reduce the deformation of the elastic body 430, thereby reducing the elastic force. Thus, it is possible to reduce the support torque as the angle deviates from the maximum angle of the support torque application.

In addition, the profile groove 122 may be configured to be operated such that the angle between the main body mechanism 100 and the connecting mechanism 300 is a limiting angle (for example, about 135 [deg]) or less.

Further, when the angle between the main body mechanism 100 and the connecting mechanism 300 is in the range between the first predetermined angle or more, and the second predetermined angle or less, the profile groove 122 may be configured such that the support torque by the support force applied to the connecting mechanism 300 has the maximum value. In particular, the maximum value of the support torque by the support force may be in a range between the predetermined separation angle or more, and the second predetermined angle or less.

In other words, the profile groove 122 may be configured such that the support torque applied to the connecting mechanism 300 at an angle corresponding to about 90 [deg] where the wearer's upper arm is positioned with respect to the wearer's torso has the maximum value. Thus, the support torque is maximally applied through the connecting mechanism 300 in the region where the load is the greatest on the wearer's upper arm, thereby assisting the wearer when performing work.

The wearable apparatus may further include an adjusting mechanism 500 connected to the second end of the elastic body 430 to move the second end of the elastic body 430, thereby varying the elastic force of the elastic body 430.

The adjusting mechanism 500 may include: a threaded plate 510 integrally coupled to the main body mechanism 100; and a rotating screw 520 threaded with the threaded plate 510 while being connected to the second end of the elastic body 430, wherein as the rotating screw 520 rotates, the second end of the elastic body 430 may be moved with respect to the threaded plate 510.

The rotating screw 520 is connected to the second end of the elastic body 430, so the second end of the elastic body 430 moves as the rotating screw 520 moves, whereby it is possible to vary the elastic force of the elastic body 430. The rotating screw 520 is threaded with the threaded plate 510 integrally coupled to the main body mechanism 100, so as to be moved upward based on the main body mechanism 100 by being rotated with respect to the threaded plate 510.

Thus, by the wearer easily rotating the rotating screw 520, the elastic body 430 is deformed to vary the elastic force, and accordingly, the support torque applied to the wearer's upper arm can be varied.

Although a preferred embodiment of the present disclosure has been described for illustrative purposes, those skilled in the art will appreciate that various modifications, additions and substitutions are possible, without departing from the scope and spirit of the invention as disclosed in the accompanying claims.

What is claimed is:

1. A wearable apparatus for assisting muscular strength, the apparatus comprising:
   a main body mechanism extending in a vertical direction of a wearer's torso, and being fixed to a side of the wearer's torso under a wearer's shoulder;
   a fastening mechanism extending along an extension direction of a wearer's upper arm, the fastening mechanism being in contact with a lower surface of the wearer's upper arm;
   a connecting mechanism having a first end coupled to the fastening mechanism and a second end movably coupled to the main body mechanism, the connecting mechanism being movable with respect to the main body mechanism; and
   a support mechanism movably coupled between the first end and the second end of the connecting mechanism to apply a support force to the connecting mechanism, the support mechanism being coupled to the main body mechanism and movable with respect to the main body mechanism, wherein the support force is varied depending on a position of the support mechanism with respect to the main body mechanism,
   wherein the support mechanism includes: an elastic body generating an elastic force; and a first roller coupled to the main body mechanism and movable with respect to the main body mechanism by being connected to a first end of the elastic body through a wire, the elastic force of the elastic body is varied depending on relative positions of the first roller and the main body mechanism, whereby the support force applied to the connecting mechanism is varied, the connecting mechanism includes: a first sliding groove extending in a longitudinal direction of the connecting mechanism; and a coupling body movable along the first sliding groove, and the coupling body is integrally coupled with the first roller.

2. The apparatus of claim 1, further comprising a torso harness being coupled to the main body mechanism and surrounding the wearer's torso such that the main body mechanism is fixed to the side of the wearer's torso.

3. The apparatus of claim 2, further comprising a shoulder harness being configured such that a first end thereof is coupled to the torso harness disposed at a front of the wearer, and a second end thereof is coupled to the torso harness disposed at a back of the wearer via an upper portion of the wearer's shoulder.

4. The apparatus of claim 1, wherein the main body mechanism includes:

a fixed part fixed to the wearer's torso by being brought in contact with the side of the wearer's torso; and a rotatable part coupled to the fixed part and rotatable about a rotation axis parallel to a direction in which the main body mechanism extends, and the connecting mechanism and the support mechanism are coupled to the rotatable part.

5. The apparatus of claim 4, wherein the fixed part and the rotatable part are rotatably coupled to each other at a plurality of positions spaced apart from each other along the rotation axis.

6. The apparatus of claim 1, wherein the fastening mechanism is coupled to the first end of the connecting mechanism and rotatable about a rotation axis parallel to a rotation axis of a shoulder joint of the wearer's upper arm rotating upward or downward.

7. The apparatus of claim 1, wherein the main body mechanism includes a second sliding groove extending in the vertical direction of the wearer's torso, and as the second end of the connecting mechanism slides along the second sliding groove, the connecting mechanism moves with respect to the main body mechanism.

8. The apparatus of claim 1, wherein the main body mechanism includes a profile groove extending to allow the first roller to be movable therealong such that support torque is generated by the support force applied to the connecting mechanism.

9. The apparatus of claim 8, wherein the profile groove has a cam surface having a predetermined cam profile and a moving trajectory of the first roller corresponds to the cam surface, a magnitude and a direction of the support force applied to the connecting mechanism vary and a point to which the support force is applied varies, and the support torque varies depending on a position of the first roller in the profile groove.

10. The apparatus of claim 8, wherein the support torque generated by the support force is 0, when an angle between the main body mechanism and the connecting mechanism is less than or equal to a first predetermined angle.

11. The apparatus of claim 8, wherein the support torque generated by the support force decreases as an angle between the main body mechanism and the connecting mechanism increases, when the angle is greater than or equal to a second predetermined angle.

12. The apparatus of claim 8, wherein the support torque generated by the support force applied to the connecting mechanism has a maximum value, when an angle between the main body mechanism and the connecting mechanism is in a range between a first predetermined angle and a second predetermined angle.

13. The apparatus of claim 1, further comprising an adjusting mechanism connected to a second end of the elastic body to move the second end of the elastic body, thereby varying the elastic force of the elastic body.

14. The apparatus of claim 13, wherein the adjusting mechanism includes: a threaded plate integrally coupled to the main body mechanism; and a rotating screw threaded with the threaded plate while being connected to the second end of the elastic body, and as the rotating screw rotates, the second end of the elastic body moves with respect to the threaded plate.

* * * * *